(12) United States Patent
Higuchi

(10) Patent No.: US 10,256,685 B2
(45) Date of Patent: Apr. 9, 2019

(54) MOTOR AND COMPRESSOR

(71) Applicant: Shin-Etsu Chemical Co., Ltd., Tokyo (JP)

(72) Inventor: Dai Higuchi, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 484 days.

(21) Appl. No.: 13/669,531

(22) Filed: Nov. 6, 2012

(65) Prior Publication Data

US 2013/0119805 A1 May 16, 2013

(30) Foreign Application Priority Data

Nov. 10, 2011 (JP) ................. 2011-246458

(51) Int. Cl.
*H02K 21/12* (2006.01)
*H02K 1/27* (2006.01)

(52) U.S. Cl.
CPC .................... *H02K 1/276* (2013.01)

(58) Field of Classification Search
CPC .............. H02K 1/27; H02K 1/2076
USPC ........... 310/156.09, 156.19, 156.36–156.38, 310/156.43, 156.45, 156.47–156.49, 310/156.53, 156.55–156.57, 216.008, 310/216.011, 216.013, 216.016, 216.096, 310/156.07, 156.78
See application file for complete search history.

(56) References Cited

U.S. PATENT DOCUMENTS

| | | | | | |
|---|---|---|---|---|---|
| 4,139,790 | A | * | 2/1979 | Steen ..................... | 310/156.83 |
| 4,451,749 | A | * | 5/1984 | Kanayama et al. ............ | 310/62 |
| 4,476,408 | A | * | 10/1984 | Honsinger ............... | 310/156.84 |
| 4,486,678 | A | * | 12/1984 | Olson ...................... | 310/156.28 |
| 5,097,166 | A | * | 3/1992 | Mikulic ................... | 310/156.83 |
| 5,672,926 | A | * | 9/1997 | Brandes et al. ............. | 310/181 |

(Continued)

FOREIGN PATENT DOCUMENTS

| | | |
|---|---|---|
| DE | 10 2009 026 287 A1 | 2/2011 |
| EP | 2 242 165 A2 | 10/2010 |

(Continued)

OTHER PUBLICATIONS

Office Action corresponding to Japanese Application No. 2011-246458 dated Sep. 24, 2014.

(Continued)

*Primary Examiner* — Naishadh Desai
(74) *Attorney, Agent, or Firm* — Myers Bigel, P.A.

(57) ABSTRACT

A motor having improved heat resistance is provided. The motor includes a rotor comprising a rotor core, two or more slots arranged in a circumferential direction of the rotor in the rotor core, two magnets in a plate shape having a thickness in a radial direction of the rotor, and divided and arranged in the circumferential direction in each of the two or more slots, and a spacer for dividing the two magnets; and a stator disposed outside of the rotor in the radial direction with a clearance from the rotor and comprising a stator core having two or more slots wound with one or more winding wires; and the two magnets are separated from each other by the spacer, by a distance which is 10% to 50% of a circumferential length of the slot having the two magnets.

6 Claims, 5 Drawing Sheets

(56) References Cited

U.S. PATENT DOCUMENTS

| | | | |
|---|---|---|---|
| 5,747,909 A * | 5/1998 | Syverson | H02H 7/06 310/114 |
| RE36,367 E * | 11/1999 | Nagate et al. | 310/156.54 |
| 7,365,466 B2 * | 4/2008 | Weihrauch et al. | 310/156.78 |
| 7,932,658 B2 * | 4/2011 | Ionel | 310/156.52 |
| 7,956,505 B2 * | 6/2011 | Shin et al. | 310/156.06 |
| 8,148,865 B2 * | 4/2012 | Kimura et al. | 310/156.38 |
| 2002/0041127 A1 * | 4/2002 | Naito et al. | 310/156.07 |
| 2002/0047436 A1 * | 4/2002 | Sakai | H02K 21/46 310/156.56 |
| 2004/0145263 A1 * | 7/2004 | Kojima et al. | 310/156.23 |
| 2007/0057589 A1 * | 3/2007 | Tatematsu et al. | 310/156.53 |
| 2008/0007131 A1 * | 1/2008 | Cai et al. | 310/156.38 |
| 2008/0129129 A1 * | 6/2008 | Kori et al. | 310/58 |
| 2011/0012461 A1 * | 1/2011 | Tomigashi | H02K 1/276 310/156.01 |

FOREIGN PATENT DOCUMENTS

| | | |
|---|---|---|
| JP | 2000-116085 | 4/2000 |
| JP | 2001-346368 A | 12/2001 |
| JP | 2003-032921 | 1/2003 |
| JP | 2009-240109 A | 10/2009 |
| JP | 2010-141989 A | 6/2010 |
| JP | 2010-206882 A | 9/2010 |
| WO | WO 2009/116572 | 9/2009 |

OTHER PUBLICATIONS

Final Office Action corresponding to Japanese Application No. 2011-246458 dated May 19, 2015.

Decision of Rejection, Japanese Patent Application No. 2011-246458, dated Jan. 5, 2016, 7 pages.

Communication with European Search Report, EP Application No. 12191823.9, dated Jul. 12, 2017, 9 pp.

Communication pursuant to Article 94(3) EPC, EP Application No. 12191829.9, dated Mar. 12, 2018, 7 pp.

* cited by examiner

MOTOR AND COMPRESSOR

RELATED APPLICATION

This application claims priority from Japanese Patent Application No. 2011-246458, filed Nov. 10, 2011, the disclosure of which is incorporated by reference herein in its entirety.

BACKGROUND OF THE INVENTION

The present invention relates to a motor used in, for example, a compressor of an air conditioner or a refrigerator, and a compressor using the motor.

In the related art, a motor 101 used in a compressor and the like comprises a rotor 110, and a stator 120 disposed outside of the rotor 110 in a radial direction with a clearance from the rotor 110 and comprising a stator core 121 having two or more slots 122 wound with one or more winding wires (not illustrated), as illustrated in FIG. 9. The rotor 110 comprises a rotor core 111 and two or more slots 112 that is arranged in a circumferential direction of the rotor core 111 and one magnet 113 is disposed in each of the slots 112 (for example, JP 2003-32921 A). Since it is not easy to manufacture a magnet which is flat and has a large size, a motor is also provided, in which a magnet is divided into two pieces in a circumferential direction of the rotor, and the two pieces are bonded and inserted into each of the slots.

SUMMARY OF THE INVENTION

In the motor in the related art, a magnet having high coercive force has been used in order to ensure heat resistance of the magnet.

As the magnet having the high coercive force, for example, a rear-earth magnet, in particular, a neodymium-based magnet may be used. Since the rare-earth magnet is made of a valuable heavy rare-earth element such as dysprosium or terbium and the magnet is at high cost, there is an object to provide a low cost motor.

Since the demand of the air conditioner and the like has remarkably increased in recent years, the demand of the rare-earth magnet used in the motor of the compressor of the air conditioner also goes on increasing inevitably. There is a concern of depletion of the heavy rare-earth element, and as a result, there is an urgent need to reduce a used amount of the heavy rare-earth element.

In the above motor in which the magnet is divided into two and inserted into each of the slots, the shapes of the bidivided magnets need to be changed for low cost.

When the sizes of the magnet in a circumferential direction, an axial direction, and a radial direction of a rotor are reduced by changing the shape of the magnet, additional change of the shape of the rotor is more effective in efficiency of the motor. However, in this case, a mold of the rotor has to be remanufactured, which is very costly. On the other hand, just by decreasing the size of the magnet without changing the shape of the rotor, the magnet is not fixed in the slot, which may be problematic.

Accordingly, an object of the present invention is to provide a motor that improves heat resistance of the magnet and the efficiency of the motor, and suppresses a used amount of the magnet.

The present inventors have intensively studied, and as a result, have found that a magnet in each of two or more slots in a rotor core is divided into two in a direction perpendicular to a radial direction of a rotor (hereinafter, referred to as a "circumferential direction") on a surface vertical to a rotation axis of a rotor, the bidivided magnets are disposed to be separated from each other by a distance of 10% to 50% of the circumferential length of the slot, thereby improving a permeance coefficient of the magnet, and improving heat resistance of the magnet and motor efficiency as compared with a case of disposing two magnets having a width which is 50% of the circumferential length of the slot in the slot. Therefore, a high-efficiency motor can be provided by selecting a shape and an arrangement of the magnet. By changing the shape of the magnet without significantly changing the shape of the existing motor, heat resistance of the magnet can be improved and the magnet can be made smaller, and as a result, a used amount of the magnet can be reduced. The present invention is accomplished from the above viewpoint.

Specifically, the present invention provides a motor, comprising: a rotor comprising a rotor core, two or more slots arranged in a circumferential direction of the rotor in the rotor core, two magnets in a plate shape having a thickness in a radial direction of the rotor, and divided and arranged in the circumferential direction in each of the two or more slots, and a spacer for dividing the two magnets; and a stator disposed outside of the rotor in the radial direction with a clearance from the rotor and comprising a stator core having two or more slots wound with one or more winding wires; wherein the two magnets have the same magnetic pole of S or N in their radially outer side and the same magnetic pole of N or S in their radially inner side, and are separated from each other by the spacer, by a distance which is 10% to 50% of a circumferential length of the slot having the two magnets. The present invention also provides a compressor using the motor.

According to the motor of the present invention, since two magnets divided in the circumferential direction and disposed to be separated from each other by a distance which is 10% to 50% of the circumferential length of the slot are provided in each slot of the rotor, the heat resistance of the magnet and the motor efficiency can be improved.

According to the motor of the present invention, since the weight of the magnet or the used amount of the magnet can be reduced, the motor can be manufactured at lower cost than the motor in the related art.

DETAILED DESCRIPTION OF THE PREFERRED EMBODIMENT

Figure 1:
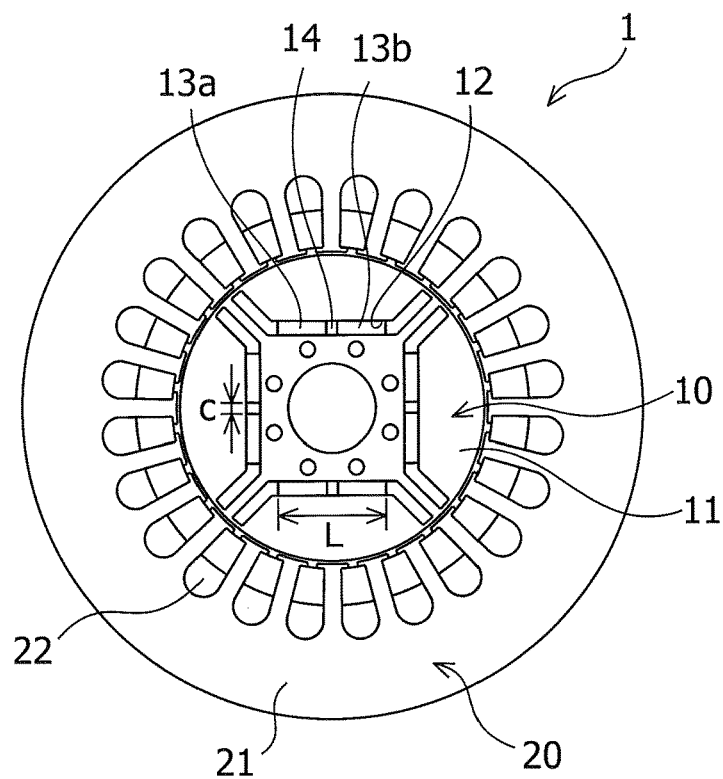
FIG. 1 shows an interior permanent magnet (IPM) motor in which a gap is provided between two magnets in an embodiment of the present invention.

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

In the present invention, magnets are divided, and arranged in a slot in a circumferential direction and separated from each other, thereby shortening a circumferential length of each of the magnets. As a result, since ellipticity of the magnet decreases, a permeance coefficient of the magnet increases and heat resistance of the magnet is improved.

The permeance coefficient of the magnet is the reciprocal of a demagnetizing coefficient. The coefficient representing thermal stability of a magnetic moment of the magnet or stability for an external magnetic field, and is significantly associated with the heat resistance of the magnet. The permeance coefficient may be calculated from the shape of the magnet, in particular, a ratio between the thickness of a magnetization direction of the magnet and the other size of the magnet. As a cross section which is vertical to the magnetization direction of the magnet increases, that is, as apparent ellipticity of the magnet increases, the permeance coefficient decreases. Meanwhile, as ellipticity of the magnet decreases, the permeance coefficient increases.

The heat resistance of the magnet indicates that heat demagnetization is not likely to occur and influences heat resistance of a motor.

Accordingly, since the heat resistance of the magnet is improved by increasing the permeance coefficient, the weight of the magnet can be reduced, and as a result, a used amount of heavy rare-earth element of the magnet can be reduced.

When two magnets are separated from each other in the circumferential direction in the slot of the rotor, and when a separation distance, that is, the width of a gap between the two magnets is 10% or longer of the circumferential length of the slot, the gap having the width which is 10% or longer of the circumferential length of the slot is provided at the circumferential center of the slot. In this case, as described below, the drop of no-load inductive voltage of the motor becomes relatively smaller as against a reduction rate of the magnet. Furthermore, a torque characteristic for input current, that is, motor efficiency is improved as compared with a case in which a single magnet which is not divided is inserted into the slot of the rotor or a case in which the width of the gap between two magnets is less than 10% of the circumferential length of the slot even though the magnet is divided into two. It is thought that the reason is that, in the case of the single magnet or the 2-divided magnets in which the width of the gap is less than 10%, a magnet region which does not contribute to the performance of the motor is present at the circumferential center of the slot. Therefore, by setting the gap between the magnets at the circumferential center of the slot, the weight of the magnet can be reduced, while an influence on a magnetic field generated by the magnets can be suppressed.

As the motor of the present invention, preferably, an interior permanent magnet (IPM) motor is used. The motor comprises a rotor, and a stator disposed outside of the rotor in the radial direction with a clearance from the rotor. The stator comprises a stator core having two or more slots. Two or more coils are formed by winding wires on the two or more slots. The rotor is rotatable in a circumferential direction thereof.

FIG. 1 illustrates a configuration diagram of a motor 1 which is an IPM motor in an embodiment of the present invention. In FIG. 1, the motor 1 comprises a rotor 10, and a stator 20 disposed outside of the rotor 10 in the radial direction with a clearance from the rotor 10. The stator 20 comprises a stator core 21 having two or more slots 22 and wires (not illustrated) are wound on the two or more slots 22. The same reference numerals refer to the elements having the same function in each figure.

The rotor comprises a rotor core and two or more slots arranged in a circumferential direction of the rotor in the rotor core. Each slot has a depth in a direction in which a rotation axis of the rotor extends (a rotation axis direction). An opening of the slot may have substantially a rectangular shape and two opposite sides of the opening may be perpendicular to a radial direction of the rotor. Preferably, the opening of the slot has a rectangular shape, two opposite sides of the opening are perpendicular to the radial direction of the rotor, and the slot is formed in a shape of a rectangular parallelepiped having a depth parallel to a rotation axis direction of the rotor (including a cube, hereinafter, the same applies). In FIG. 1, the rotor 10 comprises a rotor core 11, and two or more slots 12 arranged in the circumferential direction of the rotor 10 in the rotor core 11.

Figure 2:
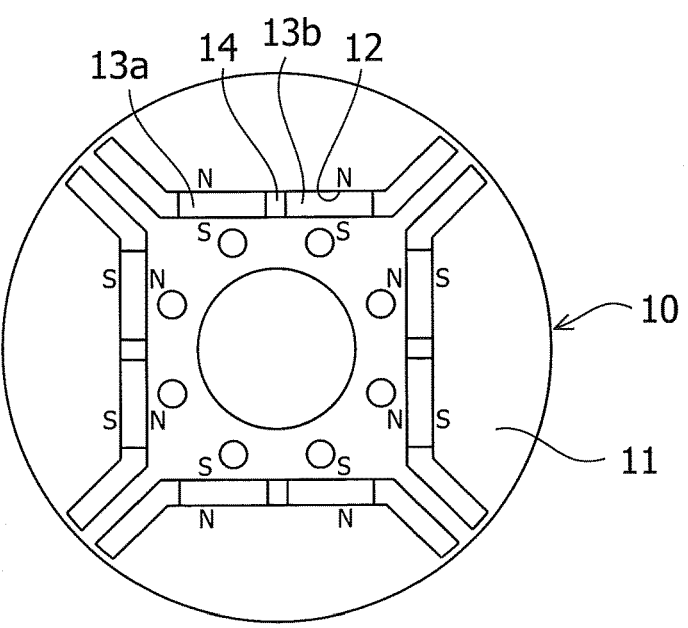
FIG. 2 shows a magnet arrangement in an embodiment of the present invention.

In each of the two or more slots, two magnets (two magnets 13a and 13b in FIG. 1) formed in a plate shape having a thickness in the radial direction of the rotor are divided and arranged in a circumferential direction of the rotor. In this case, two magnets in one slot are placed to have the same polarity of S or N in their radially outer side and have the same polarity of N or S in their radially inner side. For example, as illustrated in FIG. 2, the magnets in the slots next to each other are placed to have opposite polarities.

The magnet used in the embodiment is preferably a rare-earth magnet and more preferably, a neodymium-based magnet, and even more preferably, an Nd—Fe—B magnet. Preferably, each of the magnets is formed in the rectangular parallelepiped and each of the magnets has the shape and the size which a gap is not substantially present in the slot when the two magnets are placed in the slot, except for a gap between the two magnets. A rotation axis direction height of the magnet is preferably the same as the depth of the slot. The two magnets preferably have the same shape. The reason is that the two magnets have the same shape, such that the sizes of the two magnets used in the rotor become the same so that only one shape of magnet is needed and further, it may be advantageous in that flux generated from the magnet is stabilized.

Figure 3:
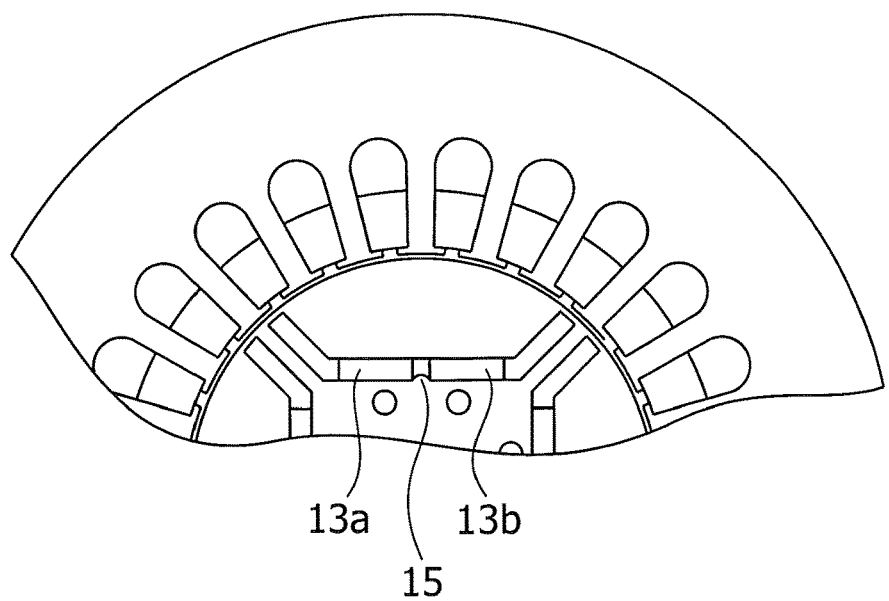
FIG. 3 shows a slot having a protrusion for holding a gap between the two magnets.
Figure 4:
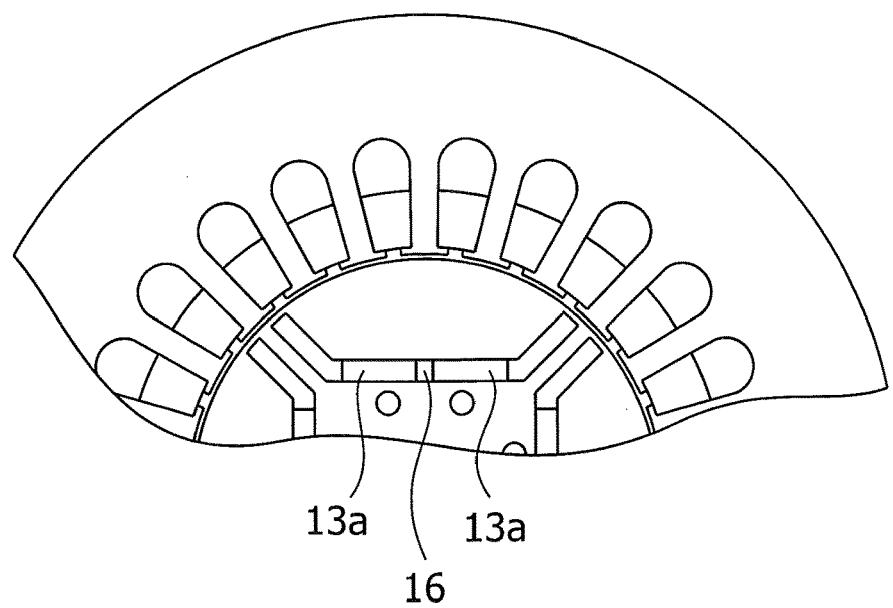
FIG. 4 shows a slot having a non-magnetic material in a gap between the two magnets.

The two magnets placed in each of the slots are separated from each other by a spacer, and the gap (a gap 14 in FIG. 1) is provided between the two magnets. The two magnets are disposed to contact inner walls of both ends in the circumferential direction of the slot by using the spacer, respectively. As long as the spacer can provide the gap between the two magnets in each slot, the spacer is not particularly limited and for example, a protrusion (a protrusion 15 in FIG. 3) or a non-magnetic material (a material 16 in FIG. 4) may be used. The protrusion may be formed at the circumferential center of the slot on an inner wall of the slot, for example, as illustrated in FIG. 3. The non-magnetic material may be formed by a non-magnetic solid. The non-magnetic material may occupy all the gap between the two magnets, and as long as the magnets are separated, the non-magnetic material may occupy only a part of the gap between the two magnets as is the case with the protrusion. Since a general motor is repeatedly heated and dissipated, a protrusion or a non-magnetic material which is difficult to be influenced by the heating and the dissipation is preferably used. If an adhesive agent is used as the spacer, the adhesive agent deteriorates by the heating and the dissipation, such that the magnets may not be fixed inappropriately.

The gap between the two magnets is preferably provided at the center of the slot in the circumferential direction. The reason is that the circumferential center of the slot is a region in which the permeance coefficient of the magnet in the slot is the lowest and further, a region that makes a small contribution to a magnetic field generated by the magnet in the rotor.

The width of the gap between the two magnets in the slot ("c" in FIG. 1) is set in the range of 10% to 50% of the length of the slot in the circumferential direction ("L" in FIG. 1). When the gap width is less than 10% of the circumferential length of the slot, the heat demagnetization factor of the magnet is not effectively decreased and it is difficult to accomplish the reduction effect of the weight of the magnet. By setting the gap width to the value equal to or more than 10% of the circumferential length of the slot, the heat demagnetization factor of the magnet is advantageously decreased, the drop of the no-load inductive voltage of the motor is relatively smaller as against the reduction ratio of the magnet, and as a result, it is possible to advantageously reduce the weight of the magnet, and it is possible to form a protrusion or insert the non-magnetic material for holding the gap between the magnets more certainly. When the gap width is more than 50% of the circumferential length of the slot, a reduction amount of the weight of the magnet is increased, but a drop amount of the no-load inductive voltage of the motor is also increased.

Hereafter, specific embodiments of the present invention will be described in detail by way of examples. However, it should not be construed that the present invention is limited to those examples.

EXAMPLES

Example 1

Figure 5:
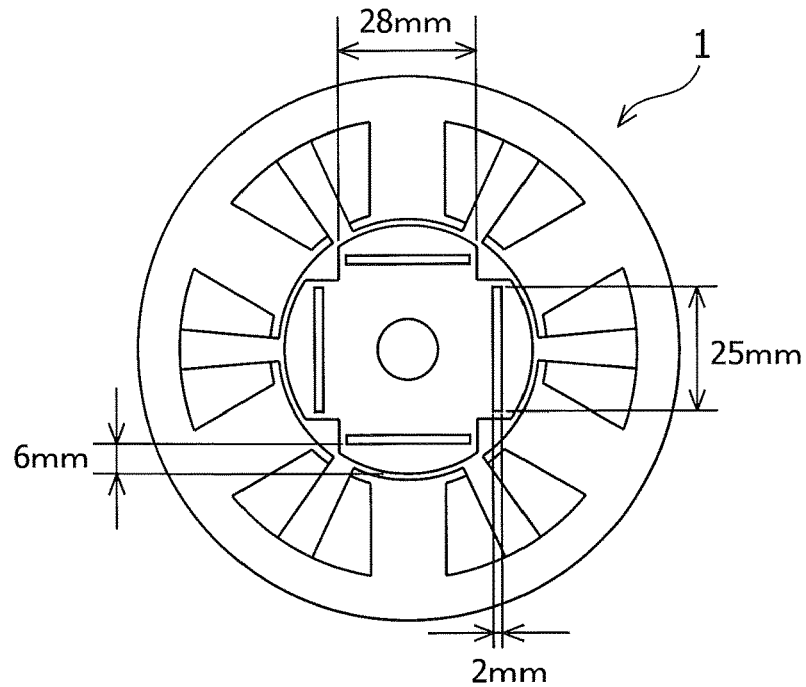
FIG. 5 shows an IPM motor used in examples.

A real machine of an IPM motor illustrated in FIG. 5 was prepared. The diameter of a rotor core was set to 49 mm, the outer diameter of a stator core was set to 109 mm. With respect to each of two or more slots of the rotor, the circumferential length was set to 25 mm, the radial direction thickness was set to 2 mm, and the rotation axis direction depth was set to 55 mm.

Figure 6:
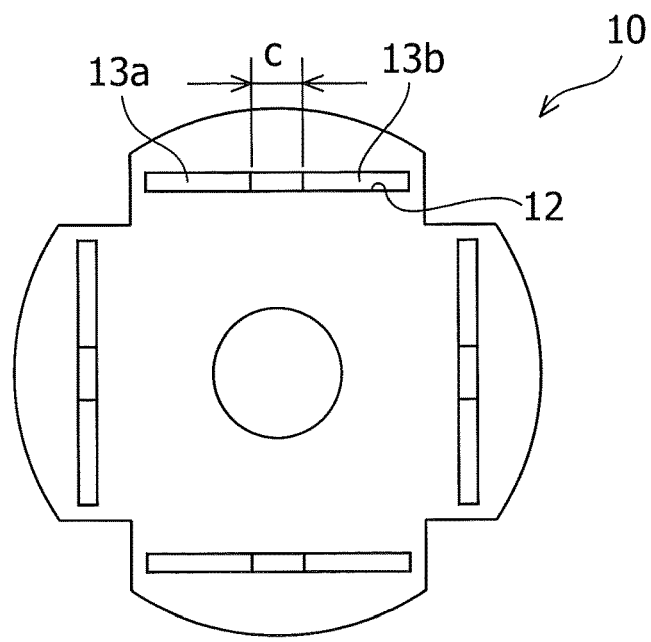
FIG. 6 shows a magnet arrangement in which the gap is provided between the two magnets.

Two magnets placed in each of the slots of the rotor had the same shape, and in each magnet, the circumferential length was set to 10.5 mm, the radial direction thickness was set to 2 mm, and the rotation axis direction height was set to 55 mm. The two magnets were placed to provide a gap between the two magnets at the circumferential center of the slot of the rotor. A gap width "c" was set to 4 mm between the two magnets in the circumferential direction (see FIG. 6). An aluminum material (with a circumferential length of 4 mm, a radial direction thickness of 2 mm, and a rotation axis direction height of 55 mm) was inserted into the gap between the two magnets as a spacer to fix the magnets.

A specification of the IPM motor is illustrated in Table 1.

TABLE 1

| Number of poles | 4 poles, 6 slots |
|---|---|
| Material of magnet | NeFeB sintered magnet |
| Materials of stator core and rotor core | 50A350 |
| Rated current | 2.5A |
| Coil wire | 200 turns in each phase |
| Wiring | 3 phases serial |

Example 2

The circumferential length of the magnet and the gap width "c" were changed from Example 1, and the similar IPM motor as Example 1 was prepared.

Two magnets placed in each slot of the rotor had the same shape. In each magnet, the circumferential length was set to 9.5 mm, the radial direction thickness was set to 2 mm, and the rotation axis direction height was set to 55 mm. The two magnets were placed in the slot to provide a gap between the two magnets at the circumferential center of the slot of the rotor. A gap width "c" was set to 6 mm between the two magnets in the circumferential direction. An aluminum material (with a circumferential length of 6 mm, a radial direction thickness of 2 mm, and a rotation axis direction height of 55 mm) was inserted into the gap between the two magnets as a spacer to fix the magnets.

Comparative Example 1

The circumferential length of the magnet and the gap width "c" were changed from Example 1, and the similar IPM motor as Example 1 was prepared.

Two magnets placed in each slot of the rotor had the same shape. In each magnet, the circumferential length was set to 12.5 mm, the radial direction thickness was set to 2 mm, and the rotation axis direction height was set to 55 mm. The two magnets were placed in the slot of the rotor in the circumferential direction and a gap width between the two magnets was set to 0 mm.

Heat Demagnetization Test

A heat demagnetization test was performed with respect to the motors of Examples 1 and 2, and Comparative Example 1.

In the heat demagnetization test, no-load inductive voltage was measured by using a power meter before heating the motor, the rotor was fixed in a state where a current advance angle is 90° and thereafter, the motors were heated up to 110° C. in an oven. In the oven, it was checked that the motors were sufficiently heated and the temperatures of the motors were stabilized and thereafter, current of 25 A equivalent to 10 times of rated current was applied to a U phase. After the application of the current, the motors were extracted from the oven and cooled down to a room temperature. Then, the inductive voltage was measured again and a demagnetization factor was calculated from the no-load inductive voltage before heating.

The relationship between the gap between the two magnets and the demagnetization factor by the heat demagnetization test is illustrated in Table 2. As compared with the case in which the gap between the two magnets was not provided (Comparative Example 1), the demagnetization factor decreased as the gap between the two magnets increased (Examples 1 and 2). Motor efficiency was calculated with respect to the motors according to Examples 1 and 2, and Comparative Example 1, and illustrated in Table 2. As compared with the case in which the gap between the two magnets was not provided (Comparative Example 1), the motor efficiency was improved as the gap between the two magnets increased (Examples 1 and 2).

TABLE 2

| | Magnetic coercive force (kA/m) | Gap Width (mm) | Gap (%) | Demagnetization factor (%) | Motor efficiency (%) |
|---|---|---|---|---|---|
| Example 1 | 1550 | 4 | 16 | 5 | 89 |
| Example 2 | 1550 | 6 | 24 | 2 | 90 |
| Comparative Example 1 | 1550 | 0 | 0 | 12 | 88 |

Comparative Examples 2 and 3

In Comparative Example 1 in which the gap between the two magnets was not provided, heat resistance of the magnet was changed and the demagnetization factor was calculated in the same manner as the above heat demagnetization test. The same IPM motor as Comparative Example 1 was used and only the heat resistance of the magnet was changed. The magnets inserted into the slot of the motor were divided into two in the circumferential direction in the slot of the rotor. As the magnets, low heat-resistant magnets (Comparative Example 2) and high heat-resistant magnets (Comparative Example 3) of the Nd—Fe—B type were used instead of the magnets of the Nd—Fe—B type which were the rare-earth magnets used in Comparative Example 1.

A result of the heat magnetization test when the gap between the two magnets was not provided and the heat resistance of the magnets was changed is illustrated in Table 3. In the high heat-resistant magnets (Comparative Example 3), the inductive voltage did not drop. In the Nd—Fe—B magnets (Comparative Example 1), the demagnetization factor was 12%. Meanwhile, in the low heat-resistant magnet (Comparative Example 2), the demagnetization factor was 30%.

TABLE 3

| | Magnetic coercive force (kA/m) | Demagnetization factor (%) |
|---|---|---|
| Comparative Example 1 | 1550 | 12 |
| Comparative Example 2 | 995 | 30 |
| Comparative Example 3 | 1670 | 0 |

From the results illustrated in Tables 2 and 3, it was confirmed that, by increasing the gap between the magnets (Examples 1 and 2), heat-resistance performance approximate to that of the high heat-resistant magnets (Comparative Example 3) can be acquired.

Comparative Examples 4 and 5

The position of the gap in Examples 1 and 2 was changed and the similar IPM motor as Example 1 was prepared.

Figure 7:
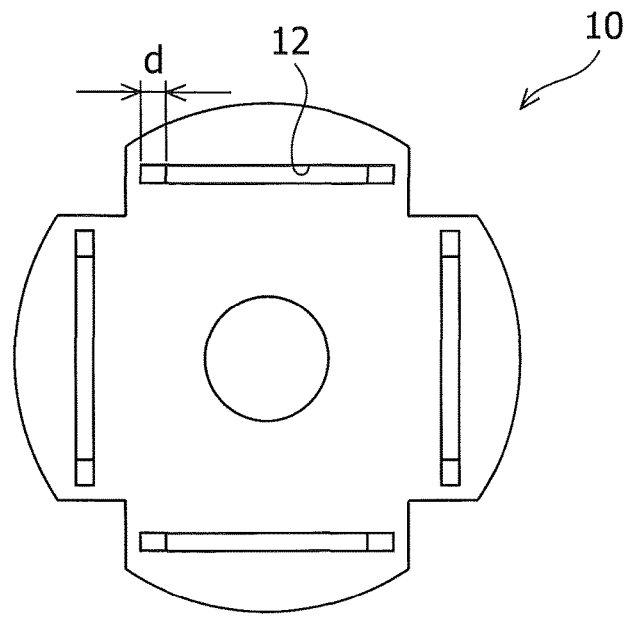
FIG. 7 shows a magnet arrangement in which the gap is provided at both ends of the slot.

The same magnets as Examples 1 and 2 were placed in the slot of the rotor to provide a gap width "d" at both ends of the slot, as illustrated in FIG. 7. The gap width "d" of Comparative Example 4 was set to 2 mm, and the gap width "d" of Comparative Example 5 was set to 3 mm, respectively. An aluminum material (a circumferential length of 2 mm (Comparative Example 4) or 3 mm (Comparative Example 5), a radial direction thickness of 2 mm, and a rotation axis direction height of 55 mm) was inserted into the gap as a spacer to fix the magnets.

Measurement Test of No-Load Inductive Voltage

The no-load inductive voltage was measured with respect to the motors according to Comparative Examples 4 and 5 similarly as in the above heat demagnetization test. With respect to the no-load inductive voltages measured in the motors in which the gap had been provided at both ends of the slot (Comparative Examples 4 and 5) and the no-load inductive voltages measured in the above heat demagnetization test in the motors in which the gap had been provided between the two magnets (Examples 1 and 2), an increase-decrease ratio (%) to the no-load inductive voltage measured in the above heat demagnetization test in the motor in which the gap had not been provided (Comparative Example 1) was calculated.

Figure 8:
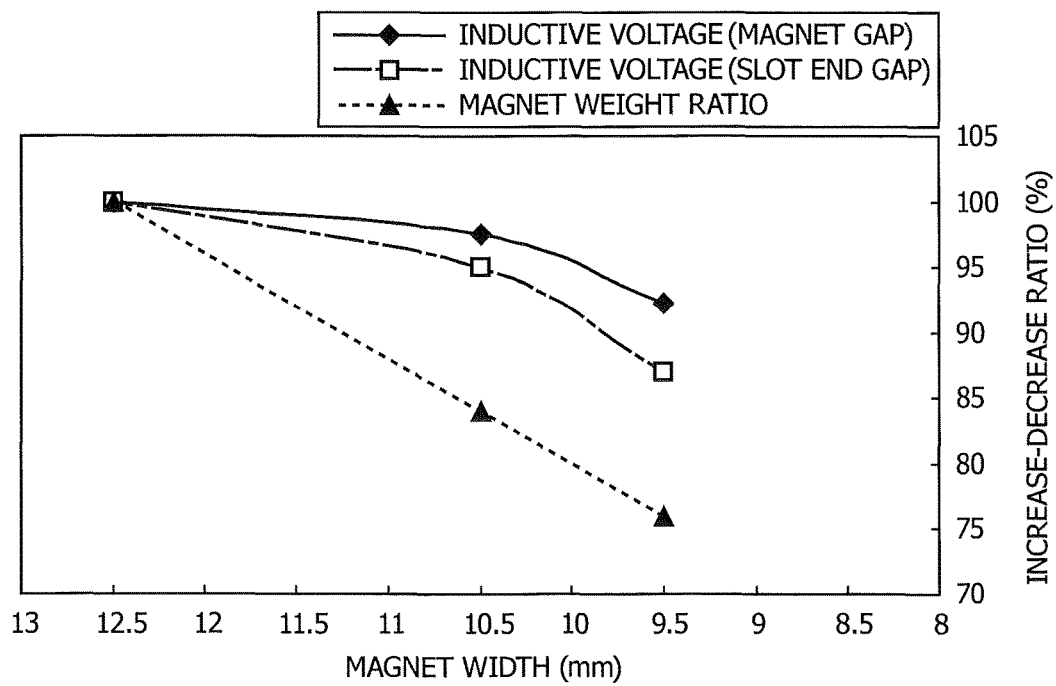
FIG. 8 shows an increase-decrease ratio of a magnet weight and an inductive voltage.
Figure 9:
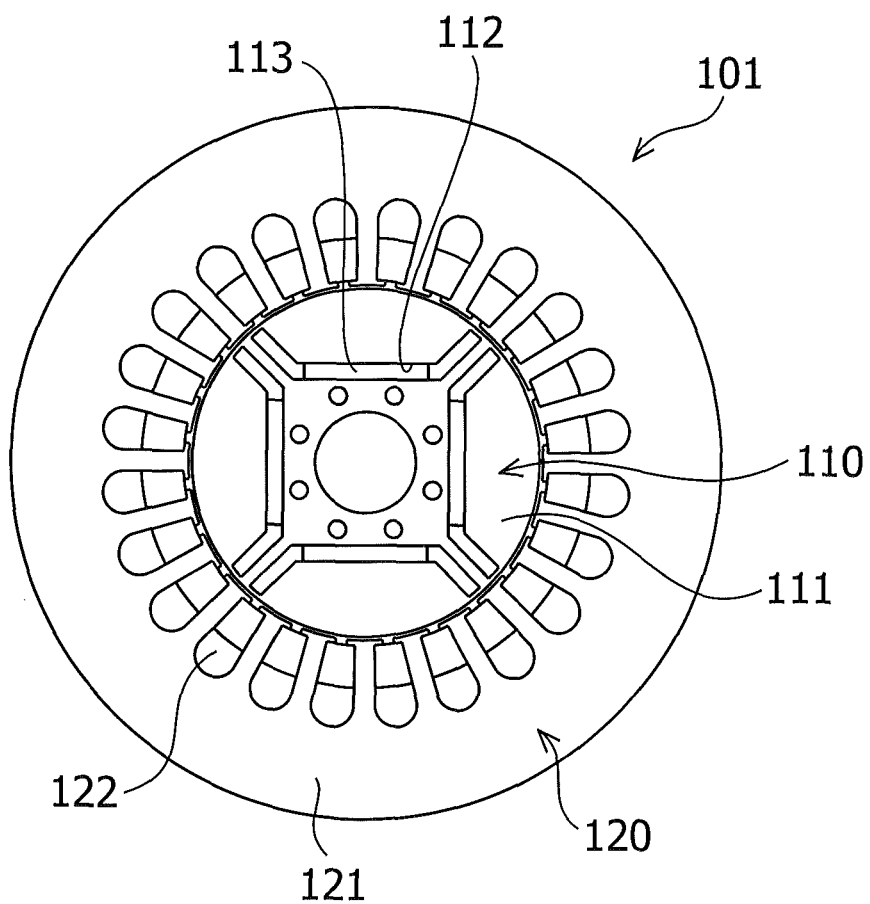
FIG. 9 shows an example of an IPM motor in the related art.

A measurement result of the no-load inductive voltage is illustrated in FIG. 8. An increase-decrease ratio (%) of the weight of the magnet by providing the gap is also illustrated. As illustrated in FIG. 8, the motor in which the gap is not provided (Comparative Example 1) has the highest inductive voltage. When the gap is increased, the motors in which the gap is provided between the two magnets (Examples 1 and 2) and the motors in which the gap is provided at both ends of the slot (Comparative Examples 4 and 5) are different in drop rate of the inductive voltage. From the results of the increase-decrease ratio of the inductive voltage and the increase-decrease ratio of the weight of the magnet, the motors in which the gap is provided between the two magnets (Examples 1 and 2) have a magnet weight reduction effect as against decreasing the inductive voltage larger than the motors in which the gap is provided at both ends of the slot (Comparative Examples 4 and 5).

Therefore, it is verified that the circumferential center of the slot is a region that makes a small contribution to the magnetic field generated by the magnet in the rotor.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A motor, comprising:
    a rotor comprising a rotor core, two or more first slots arranged in a circumferential direction of the rotor in the rotor core, two magnets in a plate shape having a thickness in a radial direction of the rotor, and divided and arranged in the circumferential direction in each of the two or more first slots, and a spacer for dividing the two magnets; and
    a stator disposed outside of the rotor in the radial direction with a clearance from the rotor and comprising a stator core having two or more second slots wound with one or more winding wires;
    wherein an opening of each of the two or more first slots has a substantially rectangular shape, wherein two opposite sides of the opening are perpendicular to a radial direction of the rotor,
    wherein the two magnets have the same magnetic pole of S or N in their radially outer side and the same magnetic pole of N or S in their radially inner side, and are separated from each other by the spacer, by a distance which is 10% to 50% of a circumferential length of the slot having the two magnets, wherein the spacer is a non-magnetic solid material that occupies all of a gap between the two magnets, and wherein the motor is an interior permanent magnet motor.

2. The motor according to claim 1, wherein the spacer is formed of aluminum material.

3. The motor according to claim 1, wherein the two magnets have the same shape.

4. A compressor comprising the motor according to claim 1.

5. A compressor comprising the motor according to claim 2.

6. A compressor comprising the motor according to claim 3.

* * * * *